(12) United States Patent
Son et al.

(10) Patent No.: US 8,715,847 B2
(45) Date of Patent: May 6, 2014

(54) LITHIUM-SULFUR BATTERY WITH POLYSULFIDE CONFINING LAYER

(75) Inventors: Sam Ick Son, Gyeonggi-do (KR); Hee Yeon Ryu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 205 days.

(21) Appl. No.: 13/295,330

(22) Filed: Nov. 14, 2011

(65) Prior Publication Data
US 2012/0315545 A1 Dec. 13, 2012

(30) Foreign Application Priority Data

Jun. 7, 2011 (KR) .......................... 10-2011-0054730

(51) Int. Cl.
*H01M 2/16* (2006.01)
*H01M 6/14* (2006.01)

(52) U.S. Cl.
USPC ............................ 429/126; 429/213; 429/248

(58) Field of Classification Search
USPC .......................................... 429/126, 248, 213
See application file for complete search history.

(56) References Cited

U.S. PATENT DOCUMENTS

| 6,165,644 | A | 12/2000 | Nimon et al. |
| 6,200,704 | B1 | 3/2001 | Katz et al. |
| 7,175,937 | B2 * | 2/2007 | Cho et al. ...................... 429/126 |
| 2002/0182508 | A1 | 12/2002 | Nimon et al. |
| 2005/0175903 | A1 * | 8/2005 | Kim et al. ..................... 429/246 |

FOREIGN PATENT DOCUMENTS

| KR | 10-0354228 | 3/2002 |
| KR | 10-0502357 | 3/2005 |
| WO | 2011023110 A1 | 3/2011 |

* cited by examiner

*Primary Examiner* — Tracy Dove
(74) *Attorney, Agent, or Firm* — Edwards Wildman Palmer LLP; Peter F. Corless

(57) ABSTRACT

The present invention provides a lithium-sulfur battery with a polysulfide confining layer, which can prevent loss of polysulfide formed on the surface of a positive electrode during charge and discharge reactions, thus improving the durability of the battery. For this purpose, the present invention provides a lithium-sulfur battery including a hydrophilic polysulfide confining layer interposed between a positive electrode and a separator to prevent a polysulfide-based material from being lost from the surface of the positive electrode during discharge.

7 Claims, 3 Drawing Sheets

LITHIUM-SULFUR BATTERY WITH POLYSULFIDE CONFINING LAYER

CROSS-REFERENCE TO RELATED APPLICATION

This application claims, under 35 U.S.C. §119(a), the benefit of Korean Patent Application No. 10-2011-0054730, filed Jun. 7, 2011, the entire contents of which are incorporated herein by reference.

BACKGROUND (a) Technical Field

The present invention relates to a lithium-sulfur battery with a polysulfide confining layer. More particularly, the present invention relates to a lithium-sulfur battery which can to prevent loss of polysulfide formed on the surface of a positive electrode during charge and discharge reactions, thus improving the durability of the battery.

(b) Background Art

In general, lithium-sulfur batteries have become a promising candidate for next-generation electric vehicles due to their excellent safety, low price of active materials, and discharge capacity of about 2,600 Wh/kg in spite of a relatively low discharge potential of about 2 V.

Referring to FIG. 1, a conventional lithium-sulfur battery is typically a secondary battery in which a sulfur-based compound with a sulfur-sulfur bond is used as a positive electrode active material. A carbon-based material, in which intercalation and deintercalation of alkali metal such as lithium or metal ions such as lithium ions take place, is used as a negative electrode active material. The lithium-sulfur battery generates and stores electrical energy through an oxidation-reduction reaction, in which, during a reduction reaction (i.e., during discharge), the S—S bonds are cleaved and thus the oxidation state of sulfur is reduced and, during an oxidation reaction (i.e., during charge), the oxidation state of sulfur increases and thus the S—S bonds are formed again. However, lithium polysulfide formed in the positive electrode during charge and discharge reactions is lost to the outside of the reaction area of the positive electrode, thus resulting in a reduction in durability.

In more detail, in a lithium-sulfur battery, the sulfur-sulfur chemical bonds are to gradually cleaved and converted into sulfur-lithium bonds during discharge, and lithium polysulfide ($Li_2Sx$, x=8, 6, 4 or 2) formed during that period is a strengthened polar material and is readily bonded to a hydrophilic solvent. The lithium polysulfide dissolved in an electrolyte can be dispersed in the form of LiSx or anions (LiSx$^-$, Sx$^{2-}$). When the lithium polysulfide is dispersed from the sulfur positive electrode, it escapes from the electrochemical reaction area of the positive electrode, and thus the amount of sulfur which participates in the electrochemical reaction of the positive electrode is reduced, thus causing capacity loss. Moreover, in the repeated charge and discharge reactions, the lithium polysulfide reacts with the lithium metal negative electrode and thus the lithium sulfide ($Li_2S$) is adhered to the surface of the lithium metal, which affects the reaction activity and reduces the potential of the battery.

Conventional techniques for solving the problem of "lithium polysulfide loss" in the lithium-sulfur batteries can be broadly classified into three categories. First, there is a method of delaying the outflow of the positive electrode active material by adding an adhesive capable of absorbing sulfur to a positive electrode composite material, in which the adhesive used includes active carbon fiber, transition metal chalcogenide, alumina, silica, etc. Second, there is a method of treating the surface of sulfur with a material containing hydroxide of a coating material, oxyhydroxide of a coating material, oxycarbonate of a coating element, or hydroxycarbonate of a coating material. Third, there is a method of confining lithium polysulfide in nano-scale capillary tubes by forming a carbon material into nanostructures.

However, the first conventional method of adding the additive capable of absorbing sulfur to the positive electrode may cause deterioration of electrical conduction, has a risk of side reactions caused by the additive, and is undesirable in terms of cost.

Moreover, according to the second method of treating the surface of sulfur with a certain material, the sulfur is lost during the treatment and it requires high cost values.

Lastly, according to the method of forming the conductive material into nanostructures, the formation process is complicated, it also requires high cost, and volume loss occurs due to the volume occupied by the carbon nanostructures. In addition, it is apprehended that the nanostructures lose their function in a rolling process during manufacturing of the battery.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a lithium-sulfur battery in which a polysulfide confining layer comprising a porous hydrophilic membrane is provided on the surface of a positive electrode to minimize the amount of polysulfide-based material lost from an electrochemical reaction area of the positive electrode during charge and discharge reactions.

In one aspect, the present invention provides a lithium-sulfur battery comprising a hydrophilic polysulfide confining layer interposed between a positive electrode and a separator to prevent a polysulfide-based material from being lost from the surface of the positive electrode during discharge.

In one embodiment, the polysulfide confining layer has a perforated structure such that a moving material in an electrolyte can be effectively dispersed during charge and discharge reactions.

In another embodiment, the polysulfide-based material comprises at least one selected from the group consisting of lithium polysulfide, LiSx, LiSx$^-$, and Sx$^{2-}$.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
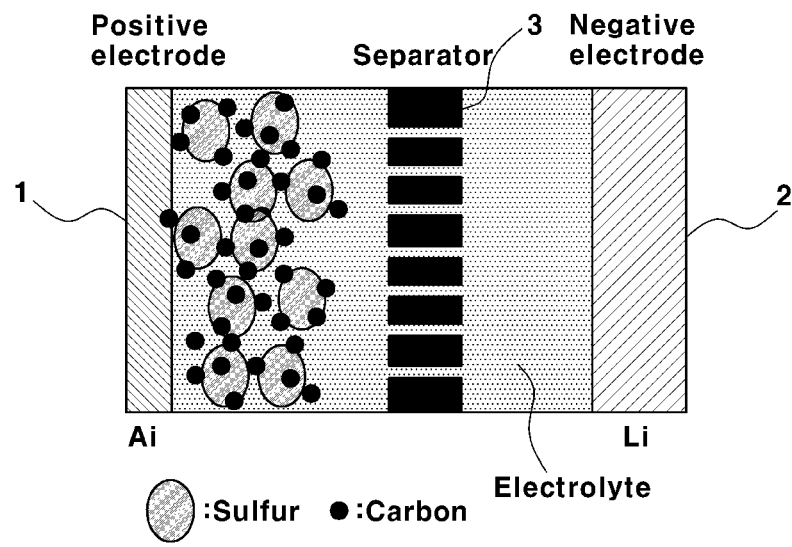
FIG. 1 is a schematic diagram showing the structure of a conventional lithium-sulfur battery.

Reference numerals set forth in the Drawings includes reference to the following elements as further discussed below:
- 1: positive electrode
- 2: negative electrode
- 3: separator
- 4: polysulfide confining layer (or porous hydrophilic membrane)

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a lithium-sulfur battery, in which a polysulfide confining layer 4 as a porous hydrophilic membrane is interposed between a positive electrode 1 and a separator 3 to confine a polysulfide-based material between the positive electrode 1 and the polysulfide confining layer 4. By utilized this embodiment of the present invention, it is possible to minimize the amount of polysulfide-based material separated from the surface of the positive electrode 1 during repeated charge and discharge reactions, thereby increasing the utilization of sulfur and the capacity of the battery. Moreover, it is possible to minimize the reaction between a lithium metal negative electrode and the polysulfide-based material, thereby improving the battery's safety.

In general, when the lithium-sulfur battery is discharged, sulfur-sulfur chemical bonds are gradually reduced and converted into sulfur-lithium bonds, and lithium polysulfide ($Li_2Sx$, $x=8, 6, 4$ or $2$), which is readily bonded to a hydrophilic solvent, is formed during that period. The lithium polysulfide is a strengthened polar material and is presently dissolved in an electrolyte. The polysulfide-based material dissolved in the electrolyte can be dispersed in the form of $LiSx$ or anions ($LiSx^-$, $Sx^{2-}$), and thus a sulfur element or the lithium polysulfide is used as a positive electrode active material in the lithium-sulfur battery. Here, for example, x is 2, 4, 6 or 8.

Therefore, in the present invention, the lithium polysulfide formed during charge and discharge reactions and the lithium polysulfide dissolved in the electrolyte and capable of being dispersed are referred to as the polysulfide-based material.

In detail, in the present invention, the polysulfide-based material includes lithium polysulfide, $LiSx$, and anions such as $LiSx^-$ and $Sx^{2-}$ where x is 2, 4, 6 or 8. When the lithium polysulfide formed in the sulfur positive electrode is dispersed and escapes from the electrochemical reaction area of the positive electrode, the amount of sulfur which participates in the electrochemical reaction of the positive electrode is reduced, thus causing capacity loss.

The reduction reaction of the lithium-sulfur battery can be divided into two steps: first, the lithium polysulfide is formed during discharge; and second, the lithium sulfide is precipitated. During initial discharge, the lithium polysulfide is continuously formed, in which the concentration of the lithium polysulfide on the surface of the positive electrode is constant, which corresponds to a constant source diffusion mechanism (see Formula 1) and, in this case, the concentration gradient of the lithium polysulfide follows a complementary error function distribution.

Then, in the lithium-sulfur battery after the reduction reaction has taken place according to the constant source diffusion mechanism, when the voltage reaches about 2.1 V, the lithium sulfide ($Li_2S$) is formed by the reaction between the lithium metal negative electrode and the lithium polysulfide in the vicinity of about 2.1 V, during which the concentration of the lithium polysulfide on the surface of the positive electrode is reduced, which corresponds to a limited source diffusion mechanism (see Formula 1). At this time, the concentration distribution of the lithium polysulfide can be exponentially reduced with respect to the square of distance x from the positive electrode.

$$\text{Constant Source } C(x, t) = C_s \text{erfc}\left[\frac{x}{2\sqrt{Dt}}\right] \quad \text{[Formula 1]}$$

$$\text{Limited Source } C(x, t) = \frac{S}{\sqrt{\pi Dt}} \exp\left(-\frac{x^2}{4Dt}\right)$$

The above Formula 1 is a well known formula for the discharge reaction mechanism of the lithium-sulfur battery and, in Formula 1, t represents the reduction reaction (i.e., discharge reaction) time, C represents the concentration, Cs represents the concentration of the surface, S represents the overall concentration of polysulfide, and $\sqrt{Dt}$ represents the diffusion distance.

In both the steps in which the lithium polysulfide is formed and the lithium sulfide is precipitated during the discharge of the lithium-sulfur battery, the polysulfide-based material (i.e., lithium polysulfide) formed in the positive electrode is dispersed, in a manner that its concentration gradient is minimized, separated from the positive electrode, passes through the electrolyte, and then reaches the surface of the negative electrode.

In the present invention, the lithium polysulfide formed on the surface of the positive electrode 1 is confined between the positive electrode 1 and the separator 3 by the hydrophilic polysulfide confining layer 4 to prevent the dispersion of the polysulfide-based material, thus increasing the utilization of sulfur, preventing the capacity loss of the battery, and improving the durability of the battery.

Figure 2:
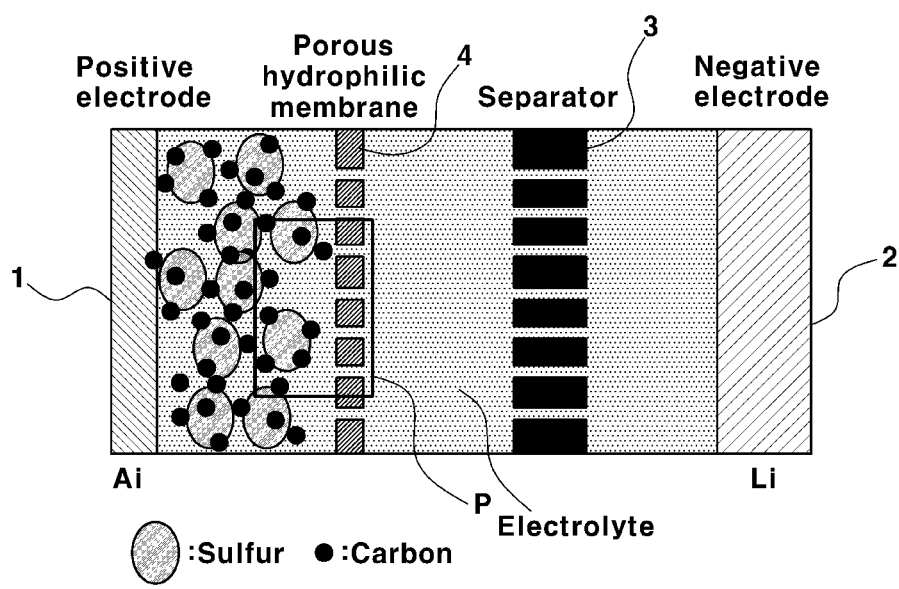
FIG. 2 is a schematic diagram showing the structure of a lithium-sulfur battery in accordance with an illustrative embodiment of the present invention.

Referring to FIG. 2, as mentioned above, the lithium-sulfur battery according to the present invention includes the separator 3 disposed between the positive electrode 1 and the negative electrode 2 and the hydrophilic polysulfide confining layer 4 provided between the positive electrode 1 and the separator 3 to prevent the polysulfide-based material from being lost from the surface of the positive electrode 1.

Typically, an electric double layer is destroyed in a high concentration electrolyte. However, in the case of a hydrophilic surface, a virtual membrane structured with a hydrophilic material is formed on the surface even in a high concentration electrolyte, thus forming an electric double layer.

The polysulfide confining layer 4 forms an electric barrier between the positive electrode 1 and the separator 3 so as to minimize the amount of polar lithium polysulfide formed during discharge and separated from the electrochemical reaction area of the positive electrode 1. The polysulfide confining layer 4 has a perforated structure having a plurality of through holes such that a moving material in the electrolyte can be effectively dispersed during charge and discharge reactions.

The moving material in the electrolyte typically comprises lithium ions moving between the negative electrode 2 and the positive electrode 1 during charge and discharge, and the lithium polysulfide formed in the positive electrode 1 is also dissolved in the electrolyte and then diffused through the through holes of the polysulfide confining layer 4.

Figure 3:
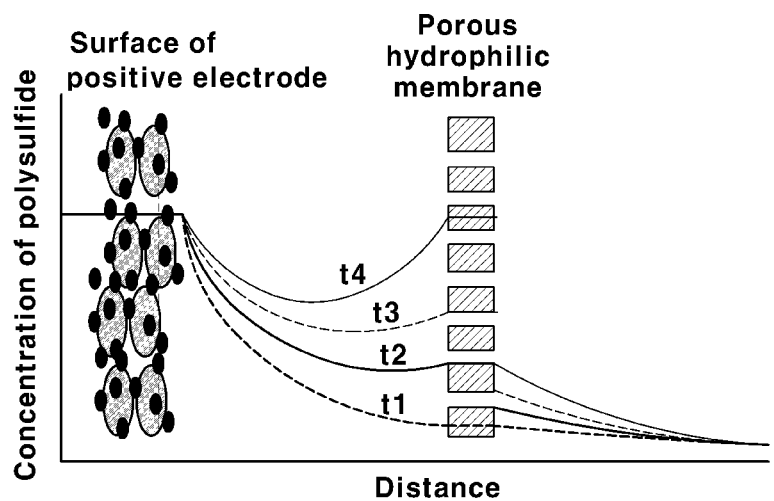
FIG. 3 is a diagram showing the relative concentration distribution of polysulfide in region P of FIG. 2 over time.

In the lithium-sulfur battery according to the present invention, a polar polysulfide source of the positive electrode 1 and the porous hydrophilic membrane 4 form an electric potential to prevent the polysulfide-based material from being separated from the positive electrode 1. That is, by the insertion of the polysulfide confining layer 4 as the porous hydrophilic membrane between the positive electrode 1 and the separator 3 of the lithium-sulfur battery, an electric barrier is formed to prevent the lithium polysulfide formed in the positive electrode 1 during discharge from escaping from the surface of the positive electrode 1. Especially, the lithium polysulfide formed in the positive electrode 1 is gradually confined in the porous hydrophilic membrane 4 (from t1 to t4 as shown in FIG. 3) as the charge and discharge are repeated.

As such, by the insertion of the polysulfide confining layer 4 as the porous hydrophilic membrane between the positive electrode 1 and the separator 3, the polysulfide-based material is confined between the positive electrode 1 and the separator 3 and absorbed on the surface of the polysulfide confining layer 4.

Figure 4:
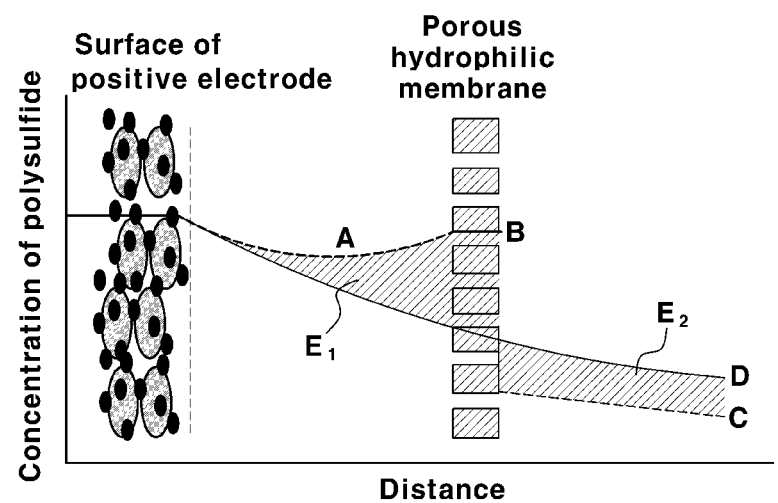
FIG. 4 is a diagram showing the polysulfide confining properties of a lithium-sulfur battery in accordance with the present invention and those of a conventional lithium-sulfur battery.

Moreover, when the polysulfide-based material is confined between the positive electrode 1 and the separator 3 and absorbed on the surface of the polysulfide confining layer 4 by the electric barrier formed by the polysulfide confining layer 4 having the hydrophilic surface, the concentration distribution of the polysulfide-based material can be obtained as shown in FIG. 4 and, as can be seen from FIG. 4, the concentration distribution of the polysulfide-based material passing through the porous hydrophilic membrane is reduced below curve D.

In FIG. 4, curve A represents the concentration of the polysulfide-based material confined between the positive electrode and the porous hydrophilic membrane, curve B represents the concentration of the polysulfide-based material absorbed on the surface of the porous hydrophilic membrane, curve C represents the concentration of the polysulfide-based material passing through the porous hydrophilic membrane and diffused to the negative electrode, and curve D represents the concentration of the polysulfide-based material in a conventional lithium-sulfur battery (as shown in FIG. 1), in which no porous hydrophilic membrane is provided.

The sum of the concentrations of curve A to C is equal to the concentration of curve D, from which it can be seen that the area of $E_1$ is equal to the area of $E_2$. Therefore, it can be seen that the lithium-sulfur battery according to the present invention (as shown in FIG. 1), in which the porous hydrophilic membrane is provided, has excellent performance for confining the polysulfide-based material, which tends to be separated from the positive electrode, as much as the area of $E_1$ (or $E_2$), compared to the conventional lithium-sulfur battery (as shown in FIG. 1).

As such, the lithium-sulfur battery according to the present invention can prevent the polysulfide-based material from being separated from the positive electrode, thereby increasing the utilization of sulfur and preventing the capacity loss of the battery. Moreover, the lithium-sulfur battery according to the present invention can prevent the lithium sulfide ($Li_2S$) from being adhered to the surface of the lithium metal, as the polysulfide-based material reacts with the lithium metal negative electrode by the repeated charge and discharge reactions. As a result, it is possible to prevent a reduction in reaction activity and a reduction in potential properties, thereby enhancing the durability and safety of the battery.

Next, the effects of the present invention will be described in detail with reference to Examples of the present invention and a Comparative Example, but the present invention is not limited thereto.

Example

A positive electrode slurry was prepared by mixing about 70% positive electrode active material (sulfur, by Aldrich, 100 mesh), about 15% conductive material (Super CP, by Timcal), and a binder (PVdF (polyvinylidene fluoride), by Kynar, flex 2901), and the thus prepared positive electrode slurry was coated on a positive electrode current collector (aluminum, by Sam-A Aluminum, 15 µm) and dried at about 80° C. for more than 2 hours.

PEG was grafted onto a porous PE membrane to impart hydrophilicity to the surface of the membrane. The resulting porous PE membrane was subjected to oxygen plasma treatment to oxidize its surface, and the PEG grafted with silane was reacted to prepare a porous hydrophilic membrane with a PEG polymer brush attached to the surface of the porous PE membrane.

Here, during the preparation of the porous hydrophilic membrane, a nonwoven fabric made of PE or a porous membrane made of PP may also be used. The thus prepared porous hydrophilic membrane was interposed between a positive electrode and a separator, and a lithium-sulfur battery was manufactured using electrolyte (TEGDME/DDIOX with LiTFSI 1M) and lithium foil (by Hodgson, 200 µm).

Comparative Example

A lithium-sulfur battery was manufactured in the same manner as the above-described Example, except for the porous hydrophilic membrane.

Test Example

Figure 5:
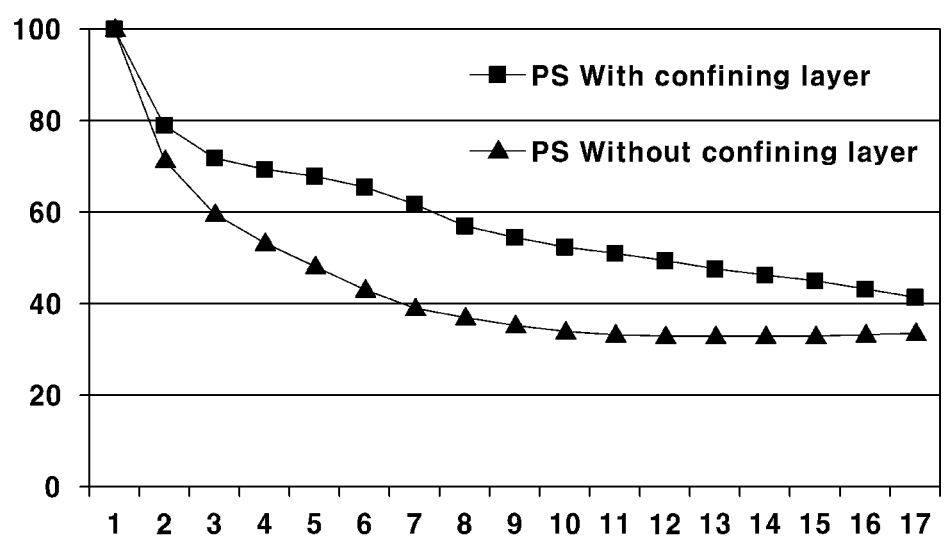
FIG. 5 is a graph showing the result of durability test of lithium-sulfur batteries prepared in Example and Test Example of the present invention.

A durability test was performed on the lithium-sulfur batteries manufactured in the Example and the Comparative Example, and the results are shown in FIG. 5.

As a result of the durability test, it can be seen from FIG. 5 that the lithium-sulfur battery with the polysulfide confining layer (i.e., the porous hydrophilic membrane) can more effectively prevent the polysulfide from being separated from the positive electrode than the lithium-sulfur battery without the polysulfide confining layer, thus delaying the capacity loss.

For reference, in FIG. 5, the X-axis represents the life cycle, and the Y-axis represents the change in capacity with respect to the initial capacity. As described above, the lithium-sulfur battery according to the present invention can increase the utilization of sulfur by minimizing the amount of polysulfide lost from the positive electrode during charge and discharge reactions and enhance the durability and safety of the battery by minimizing the reaction between the lithium metal and the polysulfide.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A lithium-sulfur battery comprising a hydrophilic polysulfide confining layer interposed between a positive electrode and a separator to prevent a polysulfide based material from being lost from a surface of the positive electrode during discharge,
wherein the hydrophilic polysulfide confining layer comprises polyethylene (PE) or polypropylene (PP) grafted with polyethylene glycol (PEG).

2. The lithium-sulfur battery of claim 1, wherein the polysulfide confining layer has a perforated structure such that a moving material in an electrolyte can be effectively dispersed during charge and discharge reactions.

3. The lithium-sulfur battery of claim 1, wherein the polysulfide-based material comprises at least one selected from the group consisting of lithium polysulfide, $LiS_x$, $LiS_x-$, and $S_x^{2-}$.

4. A battery, comprising:
a positive electrode;
a separator disposed between the positive electrode and a negative electrode; and
a hydrophilic polysulfide confining layer interposed between the separator and the positive electrode to prevent a polysulfide-based material from being lost from a surface of the positive electrode during discharger,
wherein the hydrophilic polysulfide confining layer comprises polyethylene (PE) or polypropylene (PP) grafted with polyethylene glycol (PEG).

5. The battery of claim 4, wherein the battery is a lithium-sulfur battery.

6. The battery of claim 5, wherein the polysulfide confining layer has a perforated structure such that a moving material in an electrolyte can be effectively dispersed during charge and discharge reactions.

7. The battery of claim 5, wherein the polysulfide-based material comprises at least one selected from the group consisting of lithium polysulfide, $LiS_x$, $LiS_x-$, and $S_x^{2-}$.

\* \* \* \* \*